United States Patent [19]

Counselman, III et al.

[11] Patent Number: 4,647,942

[45] Date of Patent: Mar. 3, 1987

[54] CIRCULARLY POLARIZED ANTENNA FOR SATELLITE POSITIONING SYSTEMS

[75] Inventors: Charles C. Counselman, III, Belmont; Donald H. Steinbrecher, Brookline, both of Mass.

[73] Assignee: Western Geophysical Co., Houston, Tex.

[21] Appl. No.: 642,858

[22] Filed: Aug. 21, 1984

Related U.S. Application Data

[63] Continuation of Ser. No. 323,238, Nov. 20, 1981, abandoned.

[51] Int. Cl.[4] ............................................ H01G 21/26

[52] U.S. Cl. .................................... 343/797; 343/846; 343/894

[58] Field of Search ............... 343/703, 797, 798, 846, 343/894

[56] References Cited

U.S. PATENT DOCUMENTS

| | | | |
|---|---|---|---|
| 3,922,683 | 11/1975 | Kumpebeck | 343/797 |
| 4,042,935 | 8/1977 | Ajioka et al. | 343/797 |
| 4,170,776 | 10/1979 | Frosch | 343/458 |

OTHER PUBLICATIONS

Counselman & Shapiro, "Miniature Interferometer Terminals for Earth Surveying"; Ohio State Univ., Report 280, 1978, pp. 65-85.

Counselman and Shapiro, "Miniature Interferometer Terminals for Earth Surveying"; Bulletin Geodesique, vol. 53, 1979, pp. 139-163.

Stansell, Jr.; "The MX 1502 Satellite Surveyor"; Proc. of the Second Int. Geodetic Symp. on Satellite Doppler Positioning; Jan. 22-26, 1979, Sec. 4.2, pp. 512-514.

Larsen; "Measurements to Determine the Location of the Phase Center of Geoceiver Antennas"; Proc. of Second Int. Geodetic Symp. on Satellites; Jan. 22-26, 1979, pp. 577-585.

*Primary Examiner*—Eli Lieberman
*Attorney, Agent, or Firm*—Norman E. Brunell

[57] ABSTRACT

A circularly polarized microwave radio antenna which is constructed so that its phase center can be very easily and very accurately positioned with respect to a marker point over which the antenna is placed is disclosed. The antenna includes a ground plane, antenna elements in a common plane parallel thereto and supported by a perpendicular center post, separate feed lines for each element and a combining network all positioned symmetrically about an axial bore in the center post so that the phase center of the antenna is on the axis of the center post at the intersection with the upper surface of the ground plane. A graduated rod may be positioned in the bore to align the antenna with the marker point. The antenna is especially useful in microwave radio interferometry systems for measuring relative position vectors between survey marks on the ground using radio frequency signals transmitted from earth orbiting satellites but may be used in any application where accurate positioning of an antenna's phase center relative to a reference point is desired or required. The antenna can be easily reproduced with substantially identical electrical and mechanical characteristics.

11 Claims, 9 Drawing Figures

CIRCULARLY POLARIZED ANTENNA FOR SATELLITE POSITIONING SYSTEMS

The U.S. govenment has rights in this invention pursuant to Contract Number F19628-80-C-0040 awarded by the Department of the Air Force.

This is a continuation of application Ser. No. 323,238 filed on Nov. 20, 1981, now abandoned.

BACKGROUND OF THE INVENTION

The present invention relates generally to radio antennas and more particularly to a circularly polarized antenna which is constructed such that its phase center can be very easily and very accurately positioned with respect to a point on the ground or other mounting surface over which the antenna is placed. The antenna can be reproduced with substantially identical mechanical and electrical characteristics. The antenna is especially suited for use in radio interferometry systems for measuring the relative position vector between a pair of survey marks by simultaneous observations at each survey mark of signals transmitted from earth orbiting satellites of the NAVSTAR Global Positioning Systems (GPS) but is not essentially limited to that particular application or to signals received from such sources.

Antennas for receiving or transmitting circularly polarized RF signals are well known in the art and the use of such antennas in radio frequency interferometry systems for measuring the baseline vector between points on the ground using circularly polarized RF signals transmitted from remote locations is also well known in the art.

In U.S. Pat. No. 4,170,776, issued to Robert A. Frosch as Administrator of the National Aeronautics and Space Admininstration with respect to an invention of Peter F. MacDoran there is described a system for use in detecting earth crustal deformation using an RF interferometer technique for such purposes as earthquake predictive research and eventual operational predictions. In the system described in the patent, circularly polarized RF signals from transmitters on the moon or from a plurality of earth orbiting satellites are received at two locations on earth through an antenna situated at each location, and a precise measurement is made of the time dependent phase difference between the signals received at the two locations to determine two or three spatial parameters of the antennas' relative positions. The received signal at each location is precisely time tagged and land-line routed to a central station for real-time phase comparison and analysis. By monitoring the antennas' relative positions, crustal deformation of the earth may be detected. The system includes a circularly polarized "dish" type antenna at each one of the locations from which the observations are made. This type of antenna is highly directional and must be turned toward the source of the signal being observed. Although it is difficult to determine the position of the phase center of this type of antenna, because the antenna is always rotated to point toward the source it follows that the geometrical point to which the interferometric determination of antenna position refers is defined by the two rotational axes about which the antenna turns. Because this type of antenna and the machinery required for turning it are large, the geometrical reference point usually is separated by some distance from the geodetic survey marker on the ground to which position reference must ultimately be made. Considerable effort may therefore be required to determine accurately the relative position vector between the reference point on the antenna and the one on the ground.

In a paper presented at the 9th GEOP Conference, Oct. 2-5, 1978, and appearing in the Department Geodetic Science Report No. 280 pp. 65-85, the Ohio State University, Columbus, Ohio, and in an article by Charles C. Counselman III and Irwin I. Shapiro appearing in Bulletin Geodesique, vol. 53 (1979) pp. 139-163, which articles are incorporated herein by reference, there is described a proposed system for measuring relative position vectors by radio interferometry using circularly polarized Rf signals emitted by earth orbiting satellites over a range of frequencies spanning about an octave in the 1 to 2 GHZ region for use in application such as earthquake monitoring, land surveying, navigation, spacecraft tracking and measuring gravity anomalies. The system features a miniature sized interferometer terminal containing a circularly polarized RF antenna consisting of a stack of crossed pairs of horizontal, half wavelength dipoles made of metal rod or tubing, with each pair of dipoles being cut for one or more of the frequency bands of the signals emitted by the satellites. Each dipole pair is placed three-eighths of a wavelength above a 30 to 90 centimeter diameter metal ground plane and the two orthogonal dipoles comprising each pair are fed in phase quadrature for circular polarization. This type of antenna is not very directional so that ordinarily it would not be turned but would be left fixed in orientation while it received signals from sources in various directions. The geometrical point whose position would be determined by this radio interferometry system is the phase center of the antenna. Although the article and the paper both describe the overall proposed system and certain characteristics of the receiving antennas in considerable detail no mention is made in either the article or the paper as to how the phase center of antenna may be accurately positioned with respect to a survey mark on the ground.

As can be appreciated, in order to accurately measure vectors between survey marks on the ground using radio interferometry systems it is essential that the antennas employed in such systems be constructed so that they can be accurately positioned over the survey marks. It is also essential that the antennas be constructed such that they can be reproduced with substantially identical mechanical and electrical characteristics so that their positioning relative to a survey mark will not vary from unit to unit.

The present invention provides such an antenna.

Accordingly, it is an object of this invention to provide a new and improved antenna.

It is another object of this invention to provide a new and improved circularly polarized antenna.

It is another object of this invention to provide an antenna whose phase center can be very easily and very accurately positioned with respect to a point on the ground or other surface over which it is placed.

It is a further object of this invention to provide a circularly polarized receiving antenna for use in determining relative position vectors between geodetic survey markers by radio interferometry techniques.

It is still another object of this invention to provide an antenna as described above which is particularly suited for use in measuring vectors between survey markers using circularly polarized RF signals emitted by earth orbiting satellites.

It is still another object of this invention to provide an antenna as described above whose phase center can be located with respect to a survey mark to an accuracy of a few millimeters.

It is a further object of this inventon to provide an antenna as described above, that is rugged in design, that is portable, that is relatively inexpensive to fabricate, that is easy to use and position, that can be mass produced in a reproducible manner, that contains a minimum number of parts and that can be easily assembled and disassembled.

It is yet still another object of this invention to provide an antenna as described above which has little directivity, which is capable of receiving signals simultaneously from widely separated directions in the sky with elevation angles as low as 10° and wherein the phase of the signals received is not altered significantly by signals that are reflected or scattered from the ground or other objects near the antenna.

It is another object of this invention to provide a combining network for combining into a single output RF signals received by a set of four antenna elements extending radially outward from a common axis in different directions at 90° intervals.

SUMMARY OF THE INVENTION

A circularly polarized microwave radio antenna which is constructed so that its phase center can be very easily and very accurately positioned with respect to a marker point over which the antenna is placed includes a ground plane have adjustable mounting feet, a center post mounted on the ground plane with the axis of the center post perpendicular to the ground plane, a set of four identical antenna elements projecting radially outward from the center post at 90° intervals in a common plane which is parallel to the ground plane, a separate feed line connected to each antenna element and a combining, network mounted below the center of the ground plane for combining, with 90° phase differences, the separate feed lines into a single line. The antenna elements, feed lines and circuit elements in the combining network are all matched in size and symmetrically positioned such that the phase center of the antenna is on the longitudinal axis of the center post at the intersection of this axis with the upper surface of the ground plane. An axial bore is formed in the center post and is used to mechanically align the center post over the marker point. An elongated rod for use with the antenna is also disclosed. The rod has a sharp point at one end and is sized so that it can be slidably inserted into the axial bore of the center post and through suitably positioned openings in the combining network and ground plane for precisely aligning the longitudinal axis of the center post with the marker point. The rod includes a set of graduations along its length for use in measuring the distance of the phase center from the marker point. The antenna is especially useful in microwave radio interferometry systems for measuring relative position vectors between survey marks on the ground using radio frequency signals transmitted from earth orbiting satellites but may be used in any application where accurate positioning of an antenna's phase center relative to a reference point is desired or required. The antenna can be easily reproduced with substantially identical electrical and mechanical characteristics.

BRIEF DESCRIPTION OF THE DRAWINGS

In the drawings wherein like reference numerals represent like parts.

DETAILED DESCRIPTION OF A PREFERRED EMBODIMENT

The present invention is directed to a radio antenna in which the phase center of the antenna can be very easily and very accurately positioned with respect to a marker point over which the antenna is placed. The antenna also can be easily reproduced with substantially identical mechanical and electrical characteristics. The present invention accomplishes this by providing an antenna which is constructed such that its phase center is along the longitudinal axis of the center post on which the antenna elements are mounted and by forming an axial bore in the center post to facilitate mechanical alignment of the center post with the marker point such that the distance along the axis from the marker point to the phase center is accurately determined.

Figure 1:
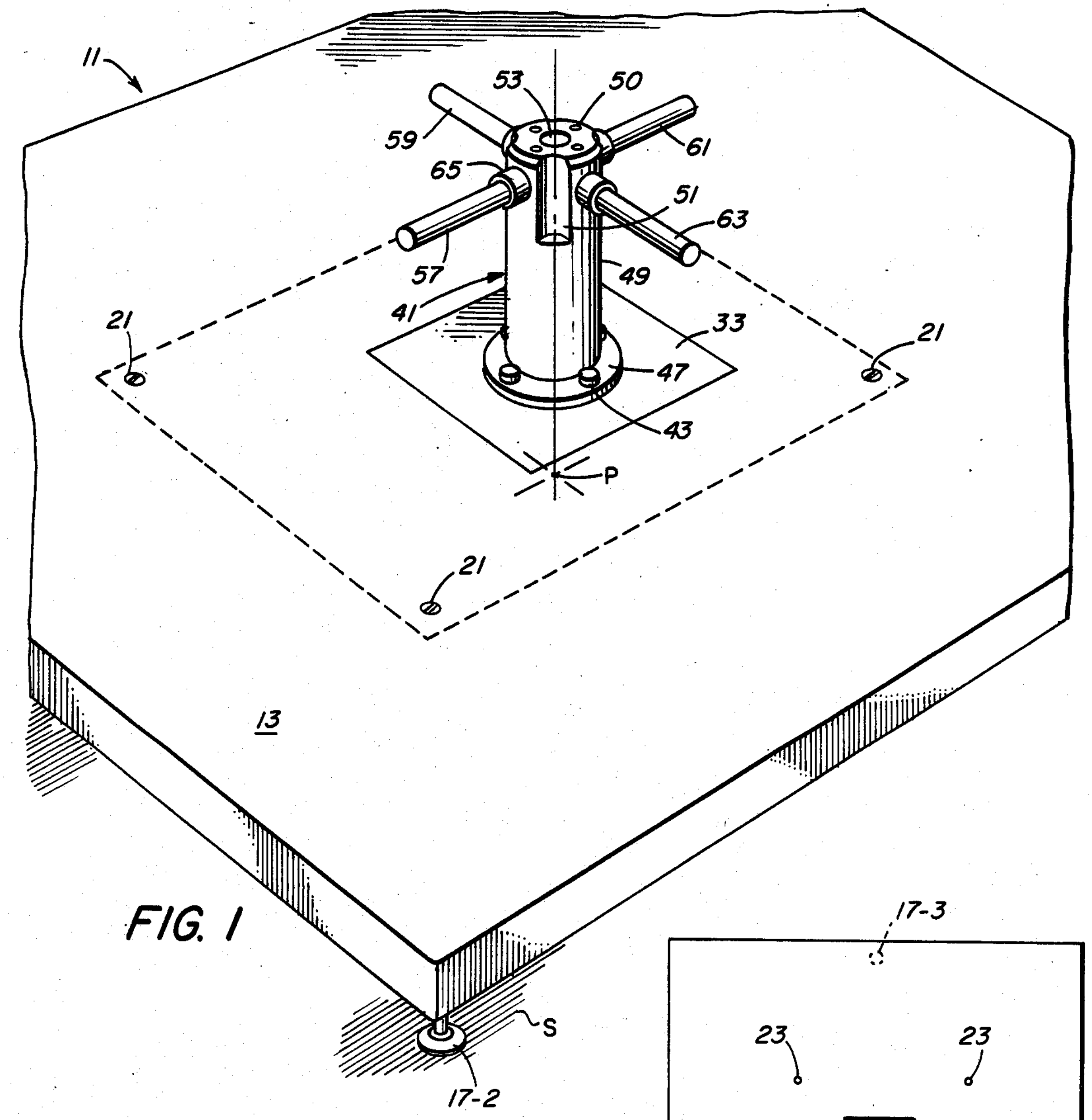
FIG. 1 is a perspective view of a circularly polarized microwave radio antenna constructed according to the teachings of the present invention.

Referring now to the drawings, there is illustrated in FIG. 1 an embodiment of an antenna constructed according to the principles of the present invention and identified generally by reference numeral 11.

Figure 2:
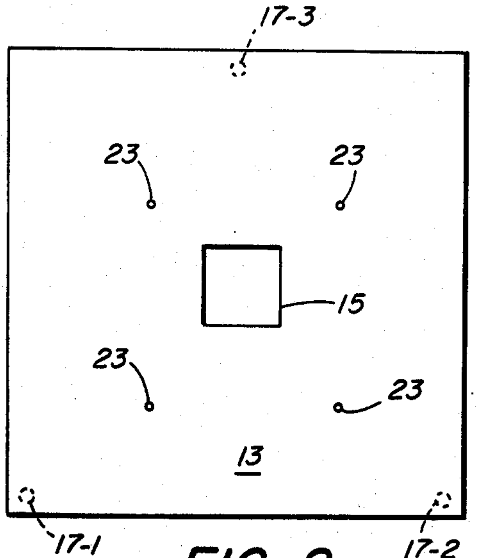
FIG. 2 is a top view of the ground plane of the antenna shown in FIG. 1.

Antenna 11 includes a rectangularly shaped ground plane 13 which is made of a sheet of aluminum or other suitable electrically conductive material. The edges of the sheet of material are preferably folded down to form an open bottom "box" like structure and a rectangularly shaped hole 15, shown in FIG. 2, is formed in the center of the sheet. Ground plane 13 is mounted on a set of three levelling feet 17-1, 17-2, and 17-3 which are used to level the ground plane 13 over the surface S on which it is placed.

Figure 3:
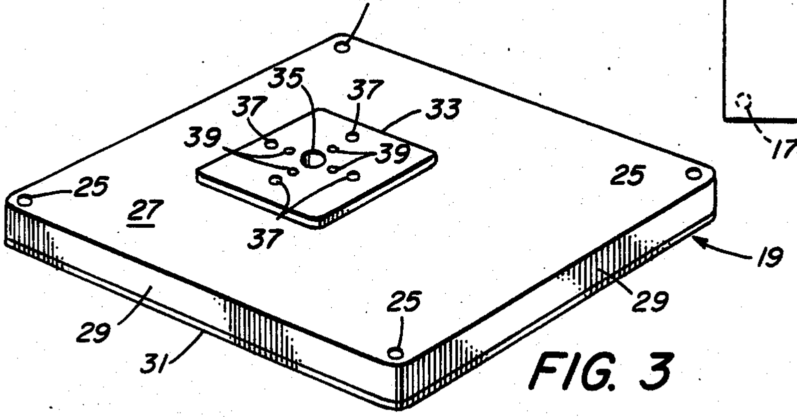
FIG. 3 is a perspective view of the base member of the antenna shown in FIG. 1.

A Rectangular "box" shaped base member 19 made of aluminum or other suitable material, shown in FIG. 3, is located underneath ground plane 13 and is fixedly attached thereto by screws 21 which extend through holes 23 in ground plane 13 and holes 25 in base member 19. Base member 19, includes a top 27, a set of four side walls 29 and a removable bottom cover 31 which is attached to the side walls 29 by any suitable means such as screws, (not shown). The top 27 includes a rectangularly shaped, integrally formed, raised portion 33 which is the same size and shape as rectangular hole 15 such that its top surface is flush with the top surface of ground plane 13. Raised portion 33 includes a circular hole 35 in the center, a set of four center post mounting holes 37 and a set of four feed line passage holes 39.

Figure 4:
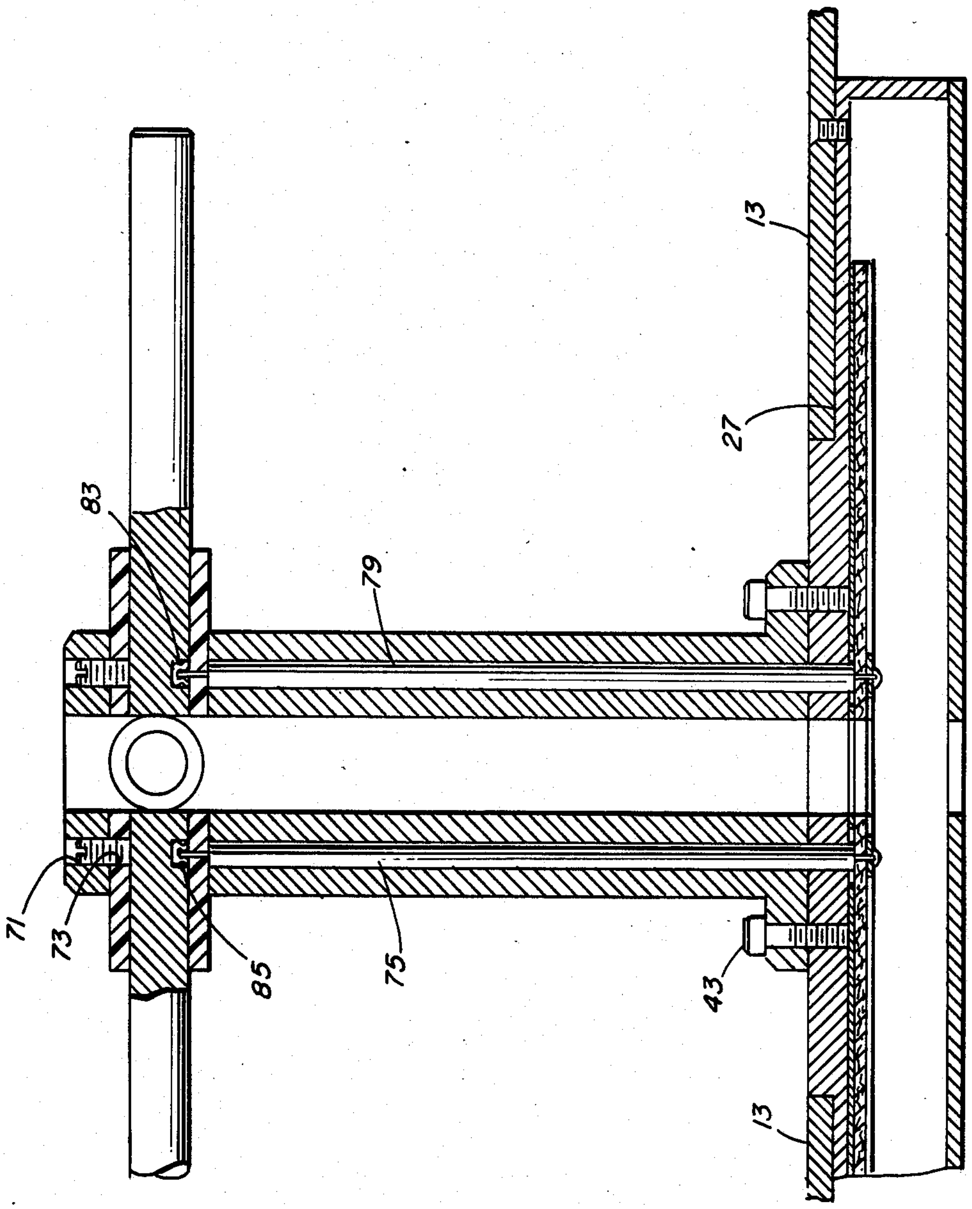
FIG. 4 is an enlarged section view of the antenna taken along lines 2—2 in FIG. 1.
Figure 6:
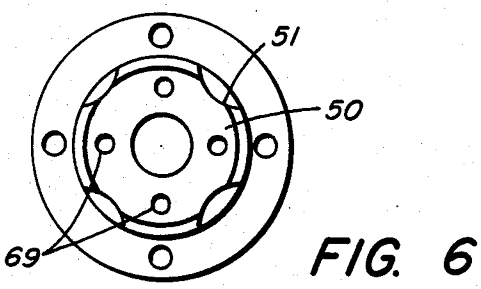
FIG. 6 is a top view of the center post of the antenna shown in FIG. 1.

As shown in FIG. 4, elongated, vertically extending center post 41 is fixedly attached to raised portion 33 of base member 19 by screws 43 which extend through mounting holes 45 in center post 41 into mounting holes 37. Center post 41 is made of a solid rod of brass or other suitable material and includes a base portion 47 which is circular in cross section and a main body portion 49 which is also generally circular in cross section, but somewhat smaller in diameter than base portion 47 and which terminates at the top in a flat horizontal surface 50. The main body portion 49 of center post 41 includes four recessed areas 51, also shown in FIG. 6, near the top which serve to improve the similarity of the current distribution on the center post 41 to the current distribution that would exist on the center post of a conventional crossed dipole antenna. An axial bore 53 is formed in center post 41 and is used as will hereinafter be explained to mechanically align the center post 41 over a point P, shown in FIG. 9 on surface S. Axial bore 53 is in axial alignment with hole 35 in base member 19 and has a cross sectional diameter that is equal to or less than the cross sectional diameter of hole 35. A set of longitudinally extending feed line passage holes 55 are also formed in center post 41 and are aligned with feed line passage holes 39 in base member 19.

Figure 5:
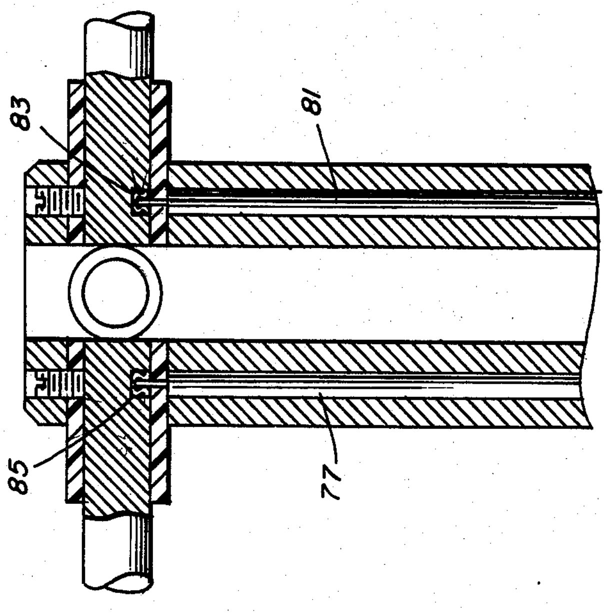
FIG. 5 is an enlarged section view of the top portion of the antenna taken along lines 3—3 in FIG. 1.

A set of four identical antenna elements, labelled 57, 59;61 and 63, which are made of solid straight rods of brass or other suitable material,are mounted on center post 41. The antenna elements project radially outward from center post 41 in a plane perpendicular to the longitudinal axis of center post 41 at a predetermined distance below top surface 50 of center post 41, and are circumferentially disposed about center post 41 at 90° intervals. As shown in FIG. 5, the inner end of each antenna element is press fit in an insulated bushing 65 made of Delrin or other suitable material which is mounted into a suitably positioned hole 67 in center post 41. Each bushing 65 is held in place in hole 67 by a set screw 69 which extends down through a hole 71 in center post 41.

Each antenna element is electrically connected to a separate feed line, the feed line for antenna element 57 being identified by reference numeral 75, the feed line for antenna element 59 being identified by reference numeral 77, the feed line for antenna element 61 being identified by reference numeral 79 and the feed line for antenna element 63 being identified by reference numeral 81. Each feed line comprises a teflon insulated silver plated wire. Each feed line extends up into a small hole 83 at the inner end of its associated antenna element through a hole 73 in bushing 65 and is locked into the hole 83 by a spring loaded jack 85 which is fixedly mounted inside hole 83. Each feed line extends down through center post 41 and through base member 19 to a combining network 87 located on the underside of top 27 of base member 19 which combines the circularly polarized signals received by the four antenna elements into a single output. Combining network 87 includes a pattern of microwave transmission strips and resistors arranged so as to form two 90° hybrid circuits and one 180° hybrid circuit.

Figure 7:
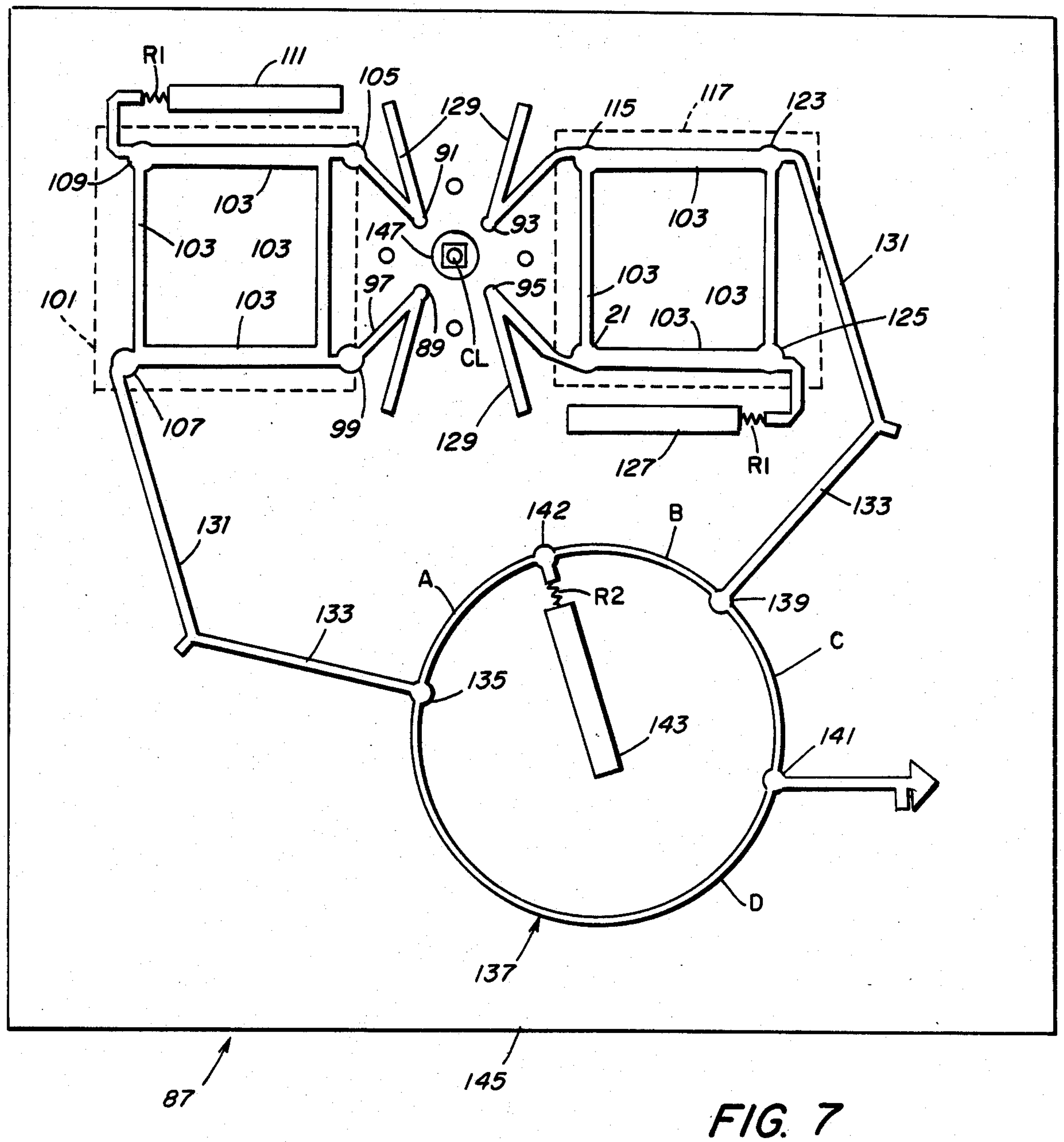
FIG. 7 is a bottom plane view of the combining network located in the base member shown in FIG. 1.

As can be seen in FIG. 7, combining network 87 includes four terminals labelled 89, 91, 93 and 95. Terminal 89 is positioned directly underneath and in electrical contact with feed line 75, terminal 91 is positioned directly underneath and in electrical contact with feed line 77, terminal 93 is positioned directly underneath and in electrical contact with feed line 79 and terminal 95 is positioned directly underneath and in electrical contact with feed line 81. Input terminal 89 is connected through a transmission strip 97 to input port 99 of a first 90° hybrid circuit 101 and input terminal 91 is connected by a similar transmission strip to input port 105 of 90° hybrid circuit 101. 90° hybrid circuit 101 includes four transmission strip segments 103, each of which has length equal to one-quarter of the signal wavelength, λ. The portions of the signals received by feed lines 75 and 77 from antenna elements 57 and 59, respectively, which are exactly 90° out of phase are added coherently by 90° hybrid circuit 101 and appear at output port 107. On the other hand, the portions of the signals from feed lines 75 and 77 which are not exactly 90° out of phase appear at output port 109 and pass through a matched terminating resistor $R_1$ which is grounded by a quarter-wavelength (λ/4) stub, transmission strip 111.

Input terminal 93 is connected by a transmission strip 113 to input port 115 of a second 90° hybrid circuit 117 and input terminal 95 is connected by a transmission strip 119 to input port 121 of 90° hybrid circuit 117. The signals appearing at input terminals 115 and 121 which are exactly 90° out of phase are added coherently by 90° hybrid circuit 117 and appear at output port 123 of 90° hybrid 117. On the other hand, the portions of the two signals which are not exactly 90° out of phase appear at output port 125 of 90° hybrid 117 and pass through a matched terminating resistor $R_1$ which is grounded by a λ/4 stub 127. A matching stub 129 is also connected to each one of input terminals 89, 91, 75, 93 and 95.

The signal appearing at output port 107 of 90° hybrid circuit 101 is transmitted by a pair of series connected transmission strips 131 and 133 to a first input port 135 of a 180° hybrid circuit 137 and the signal appearing at output terminal 123 of 90° hybrid circuit 117 is transmitted by another pair of series connected transmission strips 131 and 133 to a second input port 139 of 180° hybrid circuit 137. The 180° hybrid circuit comprises a circular transmission strip 138. In 180° hybrid circuit 137, the signals which are exactly 180° out of phase are combined and the signals which are exactly in phase are combined. The signals which are exactly 180° out of phase appear at output port 141 which is the output of the antenna 11. The signals which are exactly in phase are passed through a port 142 to a matched terminating resistor $R_2$ which is grounded by a λ/4 stub 143.

Note that for the purpose of this description the signals are assumed to have been received by the antenna. However, the entire antenna system including the combining network is also suitable for the transmission of signals in which case the directions of signal flows are simply reversed. If the antenna is to be used for transmission then further consideration must be given to the power-handling and dissipation capabilities of the materials and components used in the construction. In particular, the amount of power dissipated in each resistor must not heat the resistor excessively.

As can be appreciated, the signal from antenna element 57 is combined at 90° with the signal from antenna element 59, the signal from antenna element 61 is combined at 90° with the signals from antenna element 63 and the two combined signals are substracted to produce a single output signal.

Combining network 87 is mounted on a suitable board 145 which is fixedly secured to the underside of cover 27 of base member 19 by any suitable means, such as screws, (not shown) and is positioned on base member 19 to provide the registration described above between the feed lines and their respective input terminals. The board includes a hole 147 in the center whose cross sectional diameter is at least as large as the cross sectional diameter of axial bore 53.

As can be seen, the two 90° hybrid circuits 101 and 117 are symmetrically positioned about the center line CL of the axial bore 53. In addition, the path length from output port 107 of 90° hybrid circuit 101 to input port 135 of 180° hybrid circuit 137 and 180° hybrid circuit 137 is angularly oriented so that the two input ports 135 and 139 are symmetrically positioned relative to the center line CL of the axial bore 53. Also, the four feed lines and the four antenna elements are all symmetrically disposed about center line CL of axial bore 53. As a result, the phase center of antenna 11 is located along the center line CL.

The length of section A the section A transmission strip 138 between ports 135 and 142 is $\lambda/4$, the length of the section B of transmission strip 138 between ports 139 and 142 is $\lambda/4$, the length of the section C of transmission strip 138 between ports 139 and 141 is $\lambda/4$ and the length of the section D of transmission strip 138 between ports 135 and 141 is $3\lambda/4$.

Figure 9:
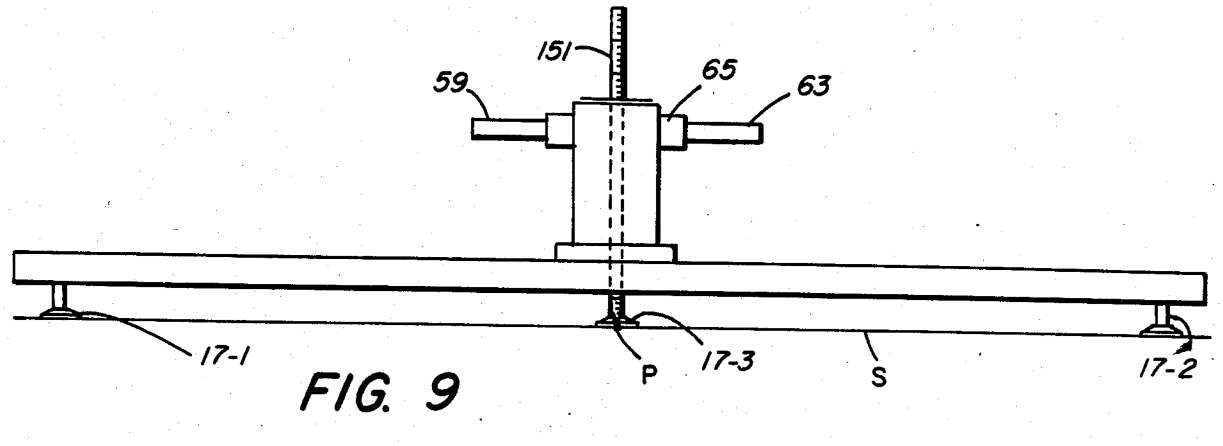
FIG. 9 is a front elevation view of the antenna shown in FIG. 1 with the rod shown in FIG. 8 inserted therein.
Figure 8:
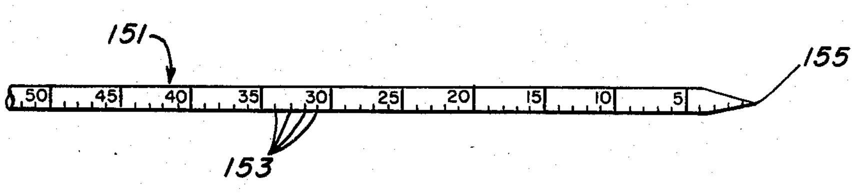
FIG. 8 is an enlarged plan view of a rod for use in connection with aligning the center post of the antenna shown in FIG. 1 over a marker point and in measuring the distance from the marker point to the phase center of the antenna.

A locating probe 151, shown in FIGS. 8 and 9 is provided for use with antenna 11 in positioning antenna 11 directly over point P on the surface S and in measuring the elevation of the antenna elements over point P. Locating probe 151 comprises an elongated straight rod 153 of brass or other suitable material terminating at one end in a sharp conically shaped tip 155. The cross sectional diameter of rod 153 is sized so that rod 153 can be slidably inserted into bore 53 in center post 41. A set of calibrations 157 are formed along the length of rod 153 so that the rod 153 can also be used as a length measuring device.

In positioning antenna 11 over point P, locating probe 151 is inserted through axial bore 53 and the hole 147 in board 145. Antenna 11 is then moved appropriately so that tip 155 of probe 151 is touching point P. Levelling feet 17 are then adjusted so that ground plane 13 is made level. The elevation of the antenna relative to point P is then measured using the calibrations 157 on rod 153 and the top flat surface 50 of center post 41 as an index. Since the height of center post 41 is known, the distance from point P to the phase center of the antenna, which is located at the intersection of the center line of the center post 41 and the top surface of ground phase 13, can be easily determined. Once the antenna is properly aligned and the elevation measured, if such a measurement is desired, the locating probe 151 is removed and the antenna is ready to use.

Typical dimensions for certain components of antenna 11 may be as follows:

Ground plane 13: 36 inches square
Length of center post 41: 3.290 inches
Diameter of axial bore 53: 0.375 inches
Diameter of rod 153: slightly less than 0.375 inches
Length of locating probe 151: 7.00 inches In an antenna actually constructed using the above dimensions, alignment of the center line of the axial bore (and the phase center of the antenna) relative to a fixed point P has been achieved to an accuracy of about ±3 millimeters, and the accuracy of positioning of the phase center with respect to the point P has been determined, by actual measurements of the phases of 19 centimeter wavelength signals emitted by GPS satellites received from a plurality of directions having angles of at least 20 degrees above the ground plane, to be within about ±5 millimeters in all three dimensions, that is, in the vertical and in both horizontal coordinates.

What is claimed is:

1. A circularly polarized radio antenna whose phase center is capable of being accurately positioned above a marker point comprising:

a. a ground plane having a hole,
b. an elongated center post located on said ground plane over said hole and extending perpendicularly upward, said center post having an axial bore,
c. a plurality of antenna elements mounted on said center post and projecting radially outward therefrom,
d. feed line means coupled to said antenna elements, and
e. a combining network coupled to the feed line means for combining signals received by antenna elements into a single output,
f. the antenna elements, feed line means and combining network being sized and arranged so that the phase center of the antenna is along the center line of the axial bore at the intersection of said center line with the ground plane,
g. whereby the phase center of said antenna can be accurately positioned with respect to said marker point by aligning said axial bore with said marker point and measuring the distance along the centerline from the marker point to the ground plane.

2. The antenna of claim 1 and further including means adapted to be used with the antenna for aligning the axial bore of the center post over said marker point.

3. The antenna of claim 2 and wherein said aligning means comprises an aligning rod adapted to be slidably inserted into said axial bore.

4. The antenna of claim 3 and wherein said aligning rod includes a set of graduations for use in determining the distance from the phase center of the antenna to the marker point.

5. The antenna of claim 1 and wherein the antenna elements comprise four elements circumferentially disposed around the center post at 90° intervals.

6. The antenna of claim 5 and wherein said feed line means comprises a separate feed line connected to each antenna element.

7. The antenna of claim 6 and wherein the combining circuit includes two 90° hydrid circuits and a 180° hybrid circuit each one of the 90° hybrid circuits being connected to a separate orthogonal pair of antenna elements.

8. The antenna of claim 7 and wherein a set of four vertical bores are formed in said center post and wherein each feed line is located in one of said bores.

9. The antenna of claim 8 and further including a base member mounted on said ground plane, said center post being mounted on said base member.

10. The antenna of claim 9 and wherein said antenna elements are solid straight rods of metal.

11. The antenna of claim 10 and further including means for leveling the ground plane on a surface on which the ground plane may be mounted.

* * * * *